US009672202B2

(12) United States Patent
Alphonso et al.

(10) Patent No.: US 9,672,202 B2
(45) Date of Patent: Jun. 6, 2017

(54) CONTEXT-AWARE RE-FORMATING OF AN INPUT

(71) Applicant: MICROSOFT CORPORATION, Redmond, WA (US)

(72) Inventors: Issac Alphonso, San Jose, CA (US); Nick Kibre, Redwood City, CA (US); Michael Levit, San Jose, CA (US); Sarangarajan Parthasarathy, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 14/220,916

(22) Filed: Mar. 20, 2014

(65) Prior Publication Data

US 2015/0269136 A1    Sep. 24, 2015

(51) Int. Cl.
  *G06F 17/27* (2006.01)
  *G10L 15/24* (2013.01)
(52) U.S. Cl.
  CPC .......... *G06F 17/276* (2013.01); *G06F 17/273* (2013.01); *G10L 15/24* (2013.01)
(58) Field of Classification Search
  CPC .................................................. G06F 17/276
  USPC .............................................................. 704/9
  See application file for complete search history.

(56) References Cited

U.S. PATENT DOCUMENTS

| 7,028,038 | B1 | 4/2006 | Pakhomov |
| 7,246,060 | B2 | 7/2007 | Geidl et al. |
| 7,679,534 | B2 | 3/2010 | Kay et al. |
| 8,204,182 | B2 | 6/2012 | Da Palma et al. |
| 8,209,183 | B1 | 6/2012 | Patel et al. |
| 2006/0069545 | A1 | 3/2006 | Wu et al. |

(Continued)

FOREIGN PATENT DOCUMENTS

| WO | 2005/119642 A2 | 12/2005 |
| WO | 2012/090027 A1 | 7/2012 |

OTHER PUBLICATIONS

"International Search Report and Written Opinion Issued in PCT Application No. PCT/US2015/021122", Mailed Date: Aug. 18, 2015, 11 Pages.

(Continued)

*Primary Examiner* — Shaun Roberts
(74) *Attorney, Agent, or Firm* — Shook, Hardy & Bacon L.L.P.

(57) ABSTRACT

Various components provide options to re-format an input based on one or more contexts. The input is received that has been submitted to an application (e.g., messaging application, mobile application, word-processing application, web browser, search tool, etc.), and one or more outputs are identified that are possibilities to be provided as options for re-formatting. A respective score of each output is determined by applying a statistical model to a respective combination of the input and each output, the respective score comprising a plurality of context scores that quantify a plurality of contexts of the respective combination. Exemplary contexts include historical-user contexts, domain contexts, and general contexts. One or more suggested outputs are selected from among the one or more outputs based on the respective scores and are provided as options to re-format the input.

18 Claims, 3 Drawing Sheets

(56) References Cited

U.S. PATENT DOCUMENTS

| | | | |
|---|---|---|---|
| 2008/0072143 A1* | 3/2008 | Assadollahi | G06F 3/0236 |
| | | | 715/261 |
| 2009/0112832 A1* | 4/2009 | Kandogan | G06Q 30/02 |
| 2009/0157385 A1 | 6/2009 | Tian | |
| 2010/0318356 A1 | 12/2010 | Hamaker et al. | |
| 2011/0029862 A1 | 2/2011 | Scott et al. | |
| 2012/0296627 A1 | 11/2012 | Suzuki et al. | |
| 2013/0110520 A1 | 5/2013 | Cheyer et al. | |
| 2014/0019117 A1* | 1/2014 | Ravi | G06F 17/276 |
| | | | 704/9 |

OTHER PUBLICATIONS

Cho, et al., "A Multi-lingual TN/ITN Framework for Speech Technology", In Proceedings of FALA 2010, Nov. 2010, pp. 213-216.

Ju, et al., "A Language-Modeling Approach to Inverse Text Normalization and Data Cleanup for Multimodal Voice Search Applications", In Proceedings of the 9th Annual Conference of the International Speech Communication Association, Sep. 22, 2008, 4 pages.

"Second Written Opinion Issued in PCT Application No. PCT/US2015/021122", Mailed Date: Mar. 15, 2016, 5 Pages.

"International Preliminary Report on Patentability Issued in PCT Application No. PCT/US2015/021122", Mailed Date: Jun. 6, 2016, 8 Pages.

* cited by examiner

CONTEXT-AWARE RE-FORMATING OF AN INPUT

BACKGROUND

Input can be provided to a computing device in various forms, such as typed or handwritten content, speech, gestures, and the like. Often, the computing device provides suggested alternatives as options to reformat the input. For example, suggested alternatives might be provided as alternative or correct spellings, speech-to-text-transcription options, auto-correct options, auto-complete options, text normalization, or inverse text normalization.

SUMMARY

An embodiment of the present invention is directed to providing options to re-format an input based on one or more contexts. The input is received that has been submitted to an application (e.g., messaging application, mobile application, word-processing application, web browser, search tool, etc.), and one or more outputs are identified that are possibilities to be provided as options for re-formatting. A respective score of each output is determined by applying a statistical model to a respective combination of the input and each output, the respective score comprising a plurality of context scores that quantify a plurality of contexts of the respective combination. Exemplary contexts include historical-user contexts, domain contexts, and general contexts. One or more suggested outputs are selected from among the one or more outputs based on the respective scores and are provided as options to re-format the input.

Embodiments of the invention are defined by the claims below, not this summary. A high-level overview of various aspects of the invention is provided here for that reason, to provide an overview of the disclosure, and to introduce a selection of concepts further described in the detailed-description section below. This summary is not intended to identify key or essential features of the claimed subject matter, nor is it intended to be used as an aid in isolation to determine the scope of the claimed subject matter.

BRIEF DESCRIPTION OF THE DRAWINGS

Illustrative embodiments of the present invention are described in detail below with reference to the attached drawing figures, which are incorporated herein by reference, wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different elements or combinations of elements similar to the ones described in this document, in conjunction with other present or future technologies. Terms should not be interpreted as implying any particular order among or between various steps herein disclosed unless and except when the order of individual steps is explicitly described.

The present invention is generally directed to re-formatting an input based on one or more contexts. Once an input is received, one or more outputs are identified and retrieved as possible alternatives that could be used to re-format the input. Each output is scored by applying a statistical model, which quantifies various contexts that apply to a combination of the input and output. Some of the outputs are selected based on the scores and are provided as options to re-format the input.

Figure 1:
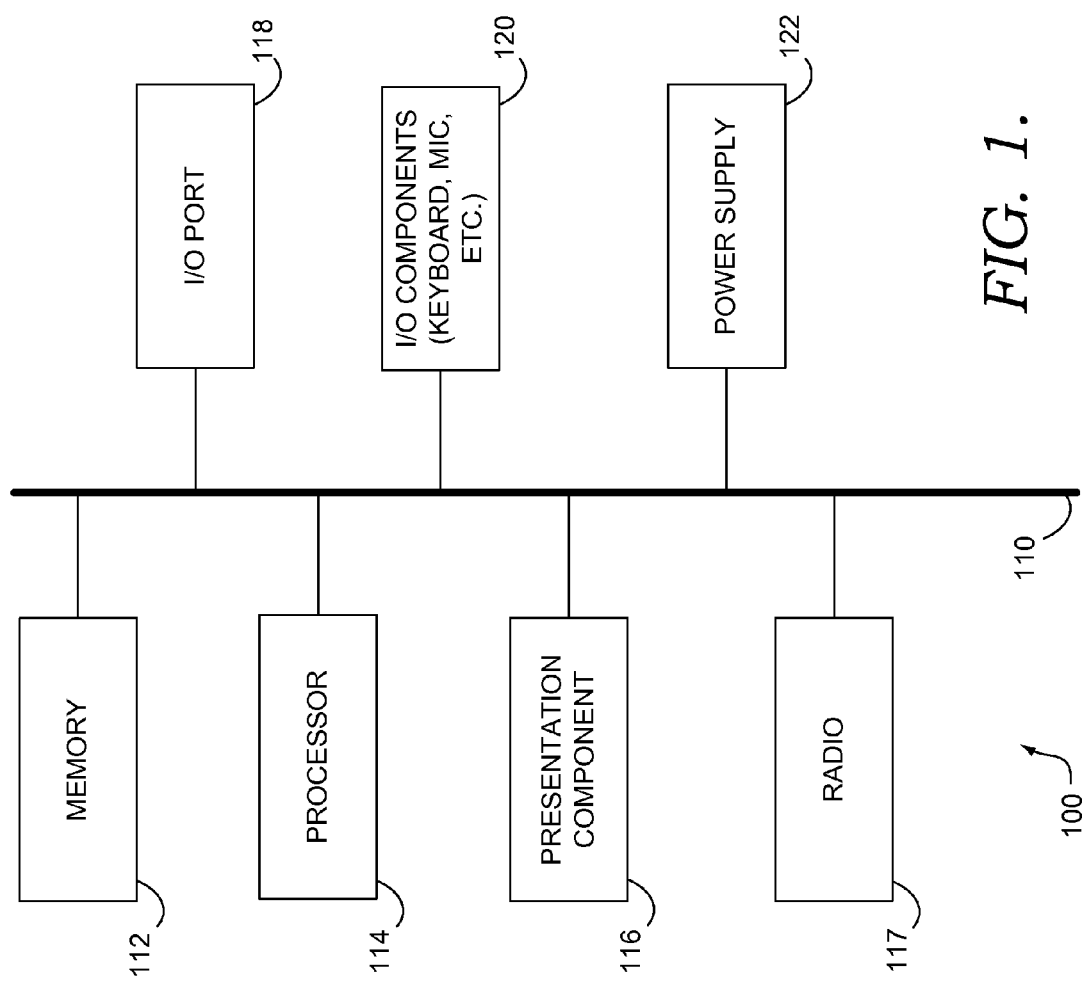
FIG. 1 depicts an exemplary computing device in accordance with an embodiment of the present invention.

Aspects of the present invention might be embodied in various forms, such as a computing device, a component of a computing device, a method, a computer-storage media or device that stores instructions, and the like. Referring now to FIG. 1, an exemplary computing environment for implementing embodiments of the present invention is shown and designated generally as computing device 100. Computing device 100 is but one example of a suitable computing environment and is not intended to suggest any limitation as to the scope of use or functionality of invention embodiments. Neither should the computing environment 100 be interpreted as having any dependency or requirement relating to any one or combination of components illustrated.

Embodiments of the invention might be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, radio 117, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media includes volatile and nonvolatile, removable and non-removable, tangible and non-transient media, implemented in any method or technology for storage of information such as computer-readable instructions, data structures, program modules or other data. Computer storage media includes RAM; ROM; EEPROM; flash memory or other memory technology; CD-ROM; digital versatile disks (DVD) or other optical disk storage; magnetic cassettes, magnetic tape, magnetic disk storage or other magnetic storage devices; or other mediums or computer storage devices which can be used to store the desired information and which can be accessed by computing device 100.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media, such as a wired network or direct-wired connection, and wireless media, such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors 114 that read data from various entities such as memory 112 or I/O components 120. Presentation component(s) 116 present data indications to a user or other device. Exemplary presentation components include a display device, speaker, printing component, vibrating component, etc.

Radio 117 functions to send and receive signals from a network, such as a telecommunications network. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
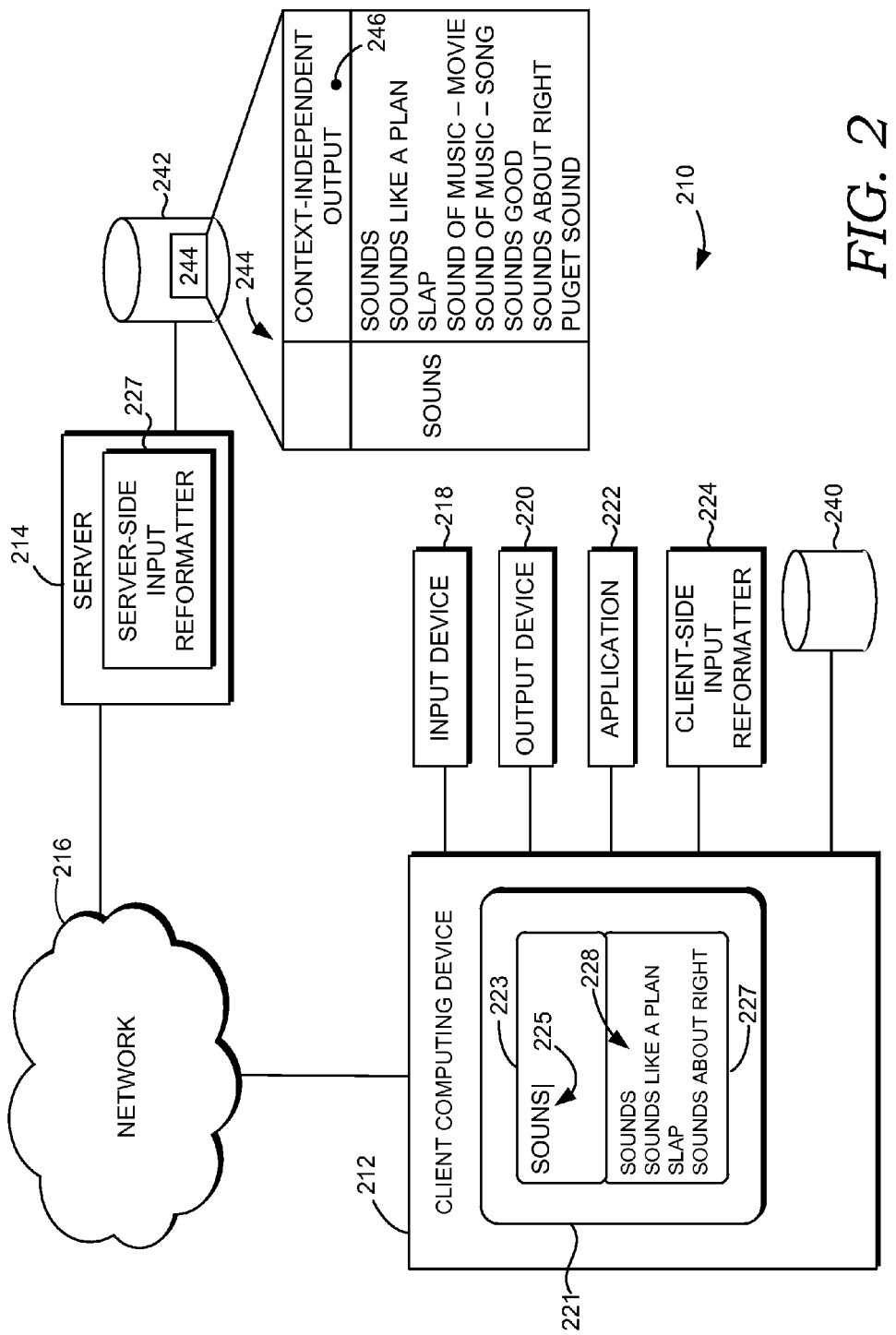
FIG. 2 depicts an exemplary computing environment in accordance with an embodiment of the present invention.

Referring now to FIG. 2, an exemplary environment 210 is depicted in accordance an embodiment of the present invention. FIG. 2 includes a computing device 212 and a server 214 that communicate with one another via a network 216. Both the computing device 212 and the server 214 are types of computing devices that include some or all of the components described with respect to FIG. 1. The network 216 might include various types of networks, such as an intranet, LAN, WAN, mobile-telecommunications network, and the Internet.

Each of the components depicted by FIG. 2 will now be described in more detail. The computing device 212 might be any of a variety of different device types, such as a mobile computing device (e.g., smart phone), desktop, laptop, tablet, and the like. The computing device 212 includes various components, such as an input device 218, output device 220, application 222, and input re-formatter 224. The computing device 212 includes other components that are not shown, such as those described with respect to FIG. 1 including a processor and memory. The input device 218 might include various types of input devices, such as a keyboard, touch-screen, microphone, biometrics sensor, gestures receiver, mouse, and the like. The output device 220 might also include various types of output device, such as a display screen, speaker, indicator light, or tactile-feedback mechanism.

FIG. 2 depicts an illustrative display screen 221 presenting an input field 223 and a drop-down suggestions menu 227. A user might provide input 225 in the input field 223 in various manners, such as by typing on a keyboard, typing on a touch-sensitive screen, providing speech input to a speech-to-text translator, and the like.

The application 222 is used to perform one or more operations on the computing device 212. For example, the application 222 might be an email application, a text-messaging application, a network browser, a search-tool accessed by a browser, a word-processing application, a mobile-device application, and the like. Inputs and commands can be provided to the application 222 using the input device 218, and the application 222 can provide outputs by way of the output device 220.

Input 225 might be provided to the application 222 when various computing tasks are being performed and in different contexts. For example, input 225 might be provided to the application 222 when content is being generated, such as a word-processing document, an email message, a text message, a blog posting, a social-network posting, a social-network comment, and the like. In another context, a user might provide the input 225 to a network browser GUI, such as a search query, a webpage address, or input that is entered into fields of a webpage. In yet a further context, the input 225 is provided to the application 222. These are merely examples of contexts and are not necessarily mutually exclusive from one another, such that the input 225 might be categorized under more than one type of context. As indicated in other parts of the application, the input 225 might be typed into the computing device 212 or provided in some other manner, such via a speech-to-text translator.

Often, an input re-formatter receives or intercepts the input 225 (e.g., SOUNS) that is provided to the application and provides suggested alternatives 228 (e.g., SOUNDS, SOUNDS LIKE A PLAN, SLAP, SOUNDS ABOUT RIGHT). The input re-formatter might be a client-side input re-formatter 224 that is an application running on the computing device 212, a component of the application 222, a component of an operating system of the computing device 212, or some combination of these client-side components. Alternatively, an input re-formatter might include a server-side input re-formatter 227 running on the server 214. While the client-side input re-formatter 224 and the server-side input re-formatter 227 might operate independently of one another to provide suggested alternatives, they might also operate in concert and communicate with one another to provide suggested alternatives.

The input re-formatter 224 or 227 might provide suggested alternatives 228 for various reasons. For example, the suggested alternatives 228 might be provided as part of an auto-correction function, an auto-complete function, and a speech-to-text transcriber. In another embodiment, the suggested alternatives 228 are provided as part of a text-normalization operation or an inverse text-normalization operation. For example, in a context in which screen or input-field real estate is limited, suggested alternatives 228 might include outputs that are more concise than the input.

Suggested alternatives 228 might be generated by the input re-formatter 224 or 227 by applying different techniques. When the input 225 is received, there might exist a set of context-independent outputs that might be helpful to a user if they were presented as suggested alternatives. For instance, if the input is "SOUNS," then a set of context-independent outputs are identified that might be options to reformat "SOUNS" regardless of the context in which "SOUNS" is provided. Exemplary context-independent outputs 246 are illustrated in FIG. 2.

In one embodiment, the context-independent outputs might be identified in real time when the input is received. Alternatively, this set of context-independent outputs might be predetermined and stored in association with the input 225, such as in an index or other storage device. For example, a datastore 240 might be maintained on the client computing device 212, or a datastore 242 might be maintained on the server 216. FIG. 2 illustrates that datastore 242 includes data 244, which is depicted in an expanded view 244 for illustrative purposes. The expanded view 244 illustrates that the data 244 associates the input "SOUNS" with a set of context-independent outputs. The same or similar data 244 might also be stored in datastore 240 on the client computing device 212. Context-independent outputs might be determined in various manners, such as based on known historical conversions from an input to outputs in any context. For instance, general user behavior might be monitored to track conversions (i.e., re-formatting) from an input to an output, and the conversions are logged in data 244.

Absent the present invention, some technologies might present any and all context-independent outputs as possible options to reformat the input 225, regardless of the relevance of the output to a context in which the input is supplied. Other technologies might try to build a separate model for each context, such as one model for email applications and a separate model for text messaging applications. However, an embodiment of the present invention is directed to scoring the context-independent outputs to determine a relevance to one or more contexts of the input by combining knowledge sources from across different contexts.

In an embodiment of the present invention, the input re-formatter 224 or 227 leverages a statistical model to score each output in a set of outputs based on one or more contexts in which the input 225 is supplied. That is, the statistical model looks at various contexts in which the input was historically re-formatted or converted into each output and quantifies the conversions. In addition, each context can be assigned a customizable weight to help determine the relevance of the context to the statistical model.

The statistical model applies a variety of contexts to evaluate outputs. For each combination of the input 225 and a respective one of the context-independent outputs, the statistical model includes the number of times the input was historically re-formatted to the respective output: in the application 222; by a user profile associated with the supplied the input 225; by a message recipient when the input 225 is included in a message (e.g., email, text, or instant message); by users that are grouped together with the user profile (e.g., friends in a social network or contacts); by users in general; in the context of an identified vertical domain (e.g., travel, sports, images, videos, etc.); or a combination thereof. These are merely examples of contexts, and a variety of other contexts might also be included in the statistical model. The statistical model looks at historical re-formatting of the input to an output under each context and then combines all of the contexts to arrive at a score.

In operation the statistical model applies an equation that mathematically combines one or more contexts that have been quantified. In one embodiment, the equation includes the following Equation 1: probability(output|input)=exp[f(input, ouput)]/Σexp[f(input, output')]. In Equation 1 "f" might be defined in various manners. That is, "f" is a general function with the input and output as parameters and the SUM over the outputs. In one instance, f(input,output) might include score(output|input;Θ), or some transformation thereof, such as Θ{score(output|input;Θ)}.

In an embodiment in which f(input,output) includes score (output|input;Θ), Equation 2 is utilized in the statistical model, including: probability(output|input)=exp[score(output|input)]Σ$_{output'}$exp[score(output'|input)]. Equation 2 is applied to determine a score of a combination of an input and a respective output. For example, referring to FIG. 2, Equation 2 might be applied to the combination of "sounds|souns" and "sounds like a plan|souns" and to one or more other input|output' combinations.

The terms of Equation 2 are further broken down into additional equations. For example, "score(output|input)" might be modeled using Equation 3: score(output|input) =λ$_1$f$_1$(general)+λ$_2$f$_2$(history)+λ$_3$f$_3$(domain)+( . . . ). According to Equation 3, each of the terms is factored by a weight, which is customizable to tune the statistical model. For example, it might be determined that user history is more indicative of likely re-formatting than domain, such that user history is assigned a higher weight than domain. In one embodiment, the weight is application-dependent and is estimated from data from a specific application or by pooling data from a collection of applications. In addition, Equation 3 is extensible and might be modified to include additional or alternative contexts. That is, Equation 3 is not necessarily limited to the contexts "general," "history," and "domain." Rather, other contexts might be identified and included in Equation 3 in addition to, or in lieu of, these contexts in order to use a linear combination of sources.

In Equation 3, the "general" context represents a broad, catch-all context in which the input is re-formatted to the respective output. The "history" context quantifies historical user conversions based on user groups, such as the user submitting the input, users with whom the user is associated or grouped (e.g., social-network links, contacts, etc.), and users as a whole. The "domain" context represents domains or environments in which the input is submitted. Examples of domain contexts include the application 222, a geographic location, verticals (e.g., web search, image context, video context, and map context), calendar, and subject-matter domains such as travel, sports, news, and the like.

The terms in Equation 3 can be further broken down to different levels of granularity. For example, score (history) might be determined using Equation 4, which includes: score(history)=λ$_1$f$_1$(general_user)+λ$_2$f$_2$(specific_user)+λ$_3$f$_3$(group)+λ$_4$f$_4$(message_recipient)+ . . . . Each of the terms in Equation 4 represents a different user context based on historical user behavior among different user groups. For instance, "specific user" represents the user submitting the input, and "group" represents a group with which the user is associated (e.g., social network). The variable "recipient" is a sub-component of "specific user" and represents re-formatting of the input to a respective input when the user is sending a message to a particular recipient. The term "general user" represents a group of users that is encompasses or overlaps with the "group." Equation 4 can be expanded or modified to include different terms or contexts. For example, Equation 4 might include a separate term for different groups to which the user belongs (e.g., gender, age, interests, occupation, etc.). As indicated in other portions of this description, each term includes a respective weight, which can be customized to tune the statistical model.

In Equation 3, the term score (domain) might also be modeled using a linear combination of sources determined using Equation 5, which includes: score(domain)=$\lambda_1 f_1$(search)+$\lambda_2 f_2$(location)+$\lambda_3 f_3$(travel)+ . . . . In Equation 5, the different domains represent re-formatting from the input to a respective output in a search-query context, user or device location context, and application context (i.e., travel application). As indicated in other portions of this description, these are merely examples of the types of domains that might be modeled using this linear combination, and the respective weights are customizable.

Applying this statistical model described herein generates a score for each output that is analyzed. As such, the quantified scores can be used to select outputs that should be provided to the computing device 212 as suggested alternatives 228 to reformat the input 225. For example, one selection criteria might be a top number (e.g., top four) of output scores, or a top percentage. As such, the respective scores might be compared to each other and the one or more suggested outputs are selected that correspond to a group of respective scores that are the highest among the respective scores (i.e., the group includes a pre-established quantity). Another criterion might include a minimum threshold score, such that respective scores that do not exceed the minimum threshold score are deemed ineligible to be provided as an option to reformat By applying the above Equation 1, the statistical model allows a pooling of training data from various contexts to leverage cross-context commonality and mitigate data scarcity problems. If the model lacks sufficient data in one particular context (e.g., message recipient), data might still exists in one or more other contexts (e.g., social-network group or user history) to provide an intelligent recommendation to the user as to how to re-format an input. That is, the model can gracefully default to a more general context that includes data from a wider range of sources.

Figure 3:
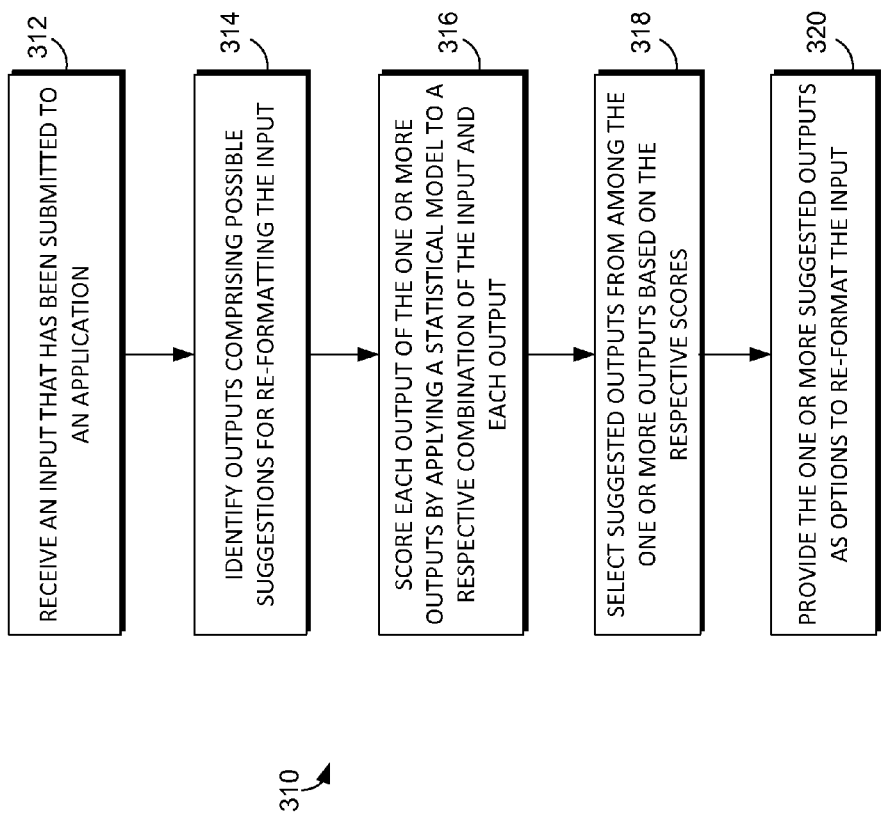
FIG. 3 depicts a flow diagram that each includes steps of a respective method in accordance with some embodiments of the present invention.

Referring to FIG. 3, a flow diagram is depicted that includes a series of steps or operations that are carried out in accordance with an embodiment of the present invention. The series of steps in FIG. 3 comprise a method or process 300 of re-formatting an input based on one or more contexts. The invention might be embodied as a computer-implemented method that includes the steps summarized in FIG. 3. The invention might also be embodied as a computing device that is programmed to perform the operations outlined in FIG. 3. In another embodiment, the present invention includes a computer-storage device that stored computer-executable instructions that, when performed by a computing device, perform the method 310. When describing method 310, reference is also made to FIG. 2.

In method 310, step 312 includes receiving an input that has been submitted to an application. For example, input 225 might be received by input re-formatter 224 or by input re-formatter 227. That is, the client-side input re-formatter 224 might receive the input 225 when it is supplied to the computing device 212, or the server-side input re-formatter might receive the input 225 from the computing device 212. The application 222 might be one or more various applications, such as a messaging application (e.g., email or text message), a word-processing application, a web browser, a mobile application, and the like.

Step 314 includes identifying one or more outputs to be used as suggestions for re-formatting the input. For example, input re-formatter 224 might retrieve context-independent outputs that are associated with the input in datastore 240, or input re-formatter 227 might retrieve context-independent outputs 246 from datastore 242.

Step 316 includes determining a respective score of each output of the one or more outputs by applying a statistical model to a respective combination of the input and each output. A respective score comprises a plurality of terms that quantify a plurality of context-specific scores of the respective combination. For instance, the input re-formatter 224 or 227 might apply Equation 1, which statistically models a linear combination of specific contexts in which the input has been re-formatted to the respective output.

An example of a context that is quantified by a context-specific score includes a history of the specific user, in which the context-specific score quantifies a frequency with which the input was reformatted to a respective output by the specific user. For example, actions of a user to format an input might be stored under a profile associated with the specific user. Those stored actions are then taken into account by when the input re-formatter applies the statistical model. Another example of a context that is quantified by a context-specific score includes a frequency with which the input has been reformatted to the respective output in the context of an application (e.g., an email application).

In step 318, one or more suggested outputs are selected from among the one or more outputs based on the respective scores. For instance, the input re-formatter 224 or 227 might rank the outputs based on respective scores and select a top number (e.g., top four) outputs. That is, the respective scores might be compared to each other and the one or more suggested outputs that correspond to a group of respective scores (e.g., pre-established quantity) that are the highest among the respective scores might be selected. Step 320 includes providing the one or more suggested outputs as options to re-format the input. The one or more outputs might be provided by way of output device 220. For example, in FIG. 2, suggested outputs 228 are displayed on the display device in a suggested-outputs dropdown menu 227.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of re-formatting an input based on one or more contexts comprising:
    receiving the input that has been submitted to an application;
    identifying a plurality of outputs comprising possible suggestions for re-formatting the input;
    calculating a respective score of each output of the plurality of outputs by applying a statistical model to a respective combination of the input and each output,
        wherein a respective score of each output comprises a plurality of context scores that quantify a plurality of contexts of the respective combination of the input and each output; and
        wherein a context score of a context is calculated by applying a customizable weight assigned to the context to a frequency with which the input was previously re-formatted to the output when the context was applicable;

selecting one or more suggested outputs from among the one or more outputs based on the respective scores; and providing the one or more suggested outputs as options to re-format the input.

2. The method of claim 1, wherein the plurality of contexts include a general-population context, a user-specific context, a user-group context, and a message-recipient context.

3. The method of claim 1, wherein the plurality of contexts includes vertical domains.

4. The method of claim 1, wherein one context of the plurality of contexts includes the application.

5. The method of claim 4, wherein the application includes a messaging application.

6. The method of claim 1, wherein the plurality of context scores represent a general context, a historical-user-selection context, and a domain context, each of which is factored by a respective weight when combined in the statistical model, and wherein the respective weight of each term is customizable to tune the statistical model.

7. The method of claim 1, wherein selecting the one or more suggested outputs includes comparing the respective scores to each other and selecting the one or more suggested outputs that correspond to a group of respective scores that are the highest among the respective scores, and wherein the group includes a pre-established quantity.

8. The method of claim 1, wherein selecting the one or more suggested outputs includes determining that the respective scores exceed a minimum score threshold, and wherein respective scores that do not exceed the minimum score threshold are deemed ineligible to be provided as an option to reformat.

9. The method of claim 1, wherein the context score includes a factor of the customizable weight and the frequency.

10. The method of claim 1, wherein the frequency is multiplied by the customizable weight to calculate the context score.

11. A computer storage device storing computer-readable instructions that, when executed, perform operations for re-formatting an input based on one or more contexts comprising:

receiving the input that has been submitted to an application, wherein the input is associated with a user profile of a specific user;

identifying one or more outputs to be used as suggestions for re-formatting the input by looking up the input in an index stored in a memory device;

determining a respective score of each output of the one or more outputs by applying a statistical model to a respective combination of the input and each output, wherein the respective score comprises:

a historical score of the respective combination quantifying a frequency with which the input has been reformatted to a respective output in a context of the specific user, wherein a first customizable weight is applied to the frequency to selectively adjust an influence of the historical score on the statistical model, and a domain score of the respective combination quantifying a frequency with which the input has been reformatted to the respective output in a context of the application, wherein a second customizable weight is applied to the frequency to selectively adjust an influence of the domain score on the statistical model;

selecting one or more suggested outputs from among the one or more outputs based on the respective scores; and providing the one or more suggested outputs as options to re-format the input.

12. The computer storage device of claim 11, wherein the application includes a messaging application and wherein the input includes a body of a message drafted using the messaging application.

13. The computer storage device of claim 12, wherein the respective score further comprises another history score of the respective combination quantifying a frequency with which the input has been reformatted to a respective output in a context of a specified recipient to whom the message is designated to be sent.

14. The computer storage device of claim 11, wherein the one or more suggested outputs provide an auto-correction option, an auto-completion option, an inverse-text-normalization option, a speech-to-text translation, or a combination thereof.

15. The computer storage device of claim 11, wherein the statistical model mathematically combines a plurality of contexts in a linear equation to calculate the respective score.

16. A computing device having a processor and a computer storage device, the processor for executing instructions stored on the computer storage device to perform operations comprising:

receiving an input that has been submitted to an application and that is associated with a user profile of a specific user;

communicating the input to an input re-formatter, which determines a respective score of each output of a plurality of outputs by applying a statistical model to a respective combination of the input and each output, wherein a respective score comprises a plurality of terms that quantify a plurality of context-specific scores of the respective combination, and wherein the statistical model applies a linear equation that includes dividing the respective score of each output by a summation of scores of the plurality of outputs;

receiving one or more suggested outputs from the input re-formatter; and presenting the one or more suggested outputs as options to re-format the input using an output device of the computing device.

17. The computing device of claim 16, wherein the input re-formatter is a client-side input re-formatter.

18. The computing device of claim 16, wherein the input re-formatter is a server-side re-formatter.

* * * * *